(12) United States Patent
Kaku et al.

(10) Patent No.: US 8,827,357 B2
(45) Date of Patent: Sep. 9, 2014

(54) UTILITY VEHICLE

(71) Applicant: Kawasaki Jukogyo Kabushiki Kaisha, Hyogo (JP)

(72) Inventors: Hidetoshi Kaku, Kakogawa (JP); Yoshinori Tsumiyama, Miki (JP); Tyler Furman, Lincoln, NE (US); Takashi Hisamura, Lincoln, NE (US)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/728,383

(22) Filed: Dec. 27, 2012

(65) Prior Publication Data

US 2014/0183906 A1    Jul. 3, 2014

(51) Int. Cl.
*B62D 25/00*    (2006.01)
*B60R 21/13*    (2006.01)

(52) U.S. Cl.
CPC ..................................... *B60R 21/13* (2013.01)
USPC .................................................... 296/190.03

(58) Field of Classification Search
CPC ........ B60N 2/682; B60N 2/012; B60N 2/015; B60N 2/38; B60K 2005/003; B60K 11/06; B60K 13/04; B60K 17/24; B60K 23/08; B60K 5/02; B60K 5/04; B60K 20/02; B62D 23/005; B62D 39/00; B62D 21/186; B62D 33/0617; B60R 21/13; B60R 21/131; B63B 3/56; B60Y 2200/124; B60Y 2200/141

USPC ............ 296/64, 190.03, 65.05, 69, 66, 182.1, 296/183.2, 183.1, 63, 186.4, 65.01, 187.01; 297/217.7; 180/291; 280/29
See application file for complete search history.

(56) References Cited

U.S. PATENT DOCUMENTS

| | | | | |
|---|---|---|---|---|
| 5,855,250 A | * | 1/1999 | Nishi ............................. | 180/312 |
| 6,336,580 B1 | * | 1/2002 | Allen et al. .................... | 224/532 |
| D503,905 S | * | 4/2005 | Saito et al. ....................... | D12/1 |
| 7,841,639 B2 | * | 11/2010 | Tanaka et al. .............. | 296/65.05 |
| 7,874,606 B2 | * | 1/2011 | Yamamura et al. ............. | 296/64 |
| 8,136,857 B2 | | 3/2012 | Shimizu et al. | |
| 2008/0289896 A1 | * | 11/2008 | Kosuge et al. ................ | 180/312 |
| 2009/0183938 A1 | * | 7/2009 | Cover et al. ................... | 180/291 |
| 2009/0256388 A1 | * | 10/2009 | Tanaka et al. .............. | 296/186.4 |

* cited by examiner

*Primary Examiner* — Glenn Dayoan
*Assistant Examiner* — Sunsurraye Westbrook
(74) *Attorney, Agent, or Firm* — Wenderoth, Lind & Ponack, L.L.P.

(57) ABSTRACT

In a utility vehicle according to the present invention, a ROPS (rollover protective structure) surrounding a riding space includes right and left side frame units, and a plurality of cross members. Each of the side frame units includes a front pipe portion extending upward from near a dashboard, an upper pipe portion extending rearward from the upper end of the front pipe portion, a rear pipe portion extending downward from the rear end of the upper pipe portion, and an intermediate pipe portion extending downward from the middle portion in the front-rear direction of the upper pipe portion. The front pipe portion, the upper pipe portion, and the rear pipe portion are integrally formed by bending.

6 Claims, 6 Drawing Sheets

UTILITY VEHICLE

BACKGROUND OF THE INVENTION

1. Field of the Invention

The present invention relates to a utility vehicle. More specifically, the present invention relates to a utility vehicle having a chassis, one or more seat rows arranged on the chassis, and a ROPS (rollover protective structure) surrounding a riding space including the seat row(s).

2. Description of the Prior Art

A ROPS surrounding a riding space has at least right and left front pipe portions extending upward from near a dashboard, right and left upper pipe portions extending rearward from the upper ends of the front pipe portions, right and left rear pipe portions extending downward from the rear ends of the upper pipe portions, and a plurality of cross member portions. When the riding space is long in the front-rear direction, longitudinal intermediate pipe portions are provided between the front pipe portions and the rear pipe portions. As a conventional document, there is U.S. Pat. No. 8,136,857.

In the coupling configuration of the pipe portions of the ROPS in the above document, the front pipe portions and the front halves of the upper pipe portions are integrally formed in an L-shape by bending, the rear pipe portions and the rear halves of the upper pipe portions are bent in an L-shape, and front and rear bending members in an L-shape are connected by joint pipes or welding. Further, the intermediate pipe portions are connected to the upper pipe portions by welding.

In the configuration of the ROPS, the number of steps of manufacturing the ROPS is increased, so that it takes time to manufacture the ROPS, and the number of components is also increased.

SUMMARY OF THE INVENTION

An object of the present invention is to reduce the number of components of a ROPS of a utility vehicle and to reduce the number of steps of manufacturing the ROPS.

To achieve the above object, a utility vehicle according to the present invention includes a chassis, one or more seat rows arranged on the chassis, and a ROPS surrounding a riding space including the seat row(s). The ROPS includes right and left side frame units, and a plurality of cross members coupling the side frame units. Each of the side frame units includes a front pipe portion extending upward from near a dashboard, an upper pipe portion extending rearward from the upper end of the front pipe portion, a rear pipe portion extending downward from the rear end of the upper pipe portion, and an intermediate pipe portion extending downward from the middle portion in the front-rear direction of the upper pipe portion, wherein the front pipe portion, the upper pipe portion, and the rear pipe portion are integrally formed by bending.

With the above configuration, the number of components for the ROPS can be reduced, and the number of steps of manufacturing the ROPS can be reduced.

The utility vehicle can preferably adopt the following configurations.

(a) Joint members are welded onto the outer peripheral surfaces of the lower ends of the front pipe portion and the rear pipe portion, the joint members connecting each of the side frame units to the chassis, and an opening edge is formed in a semi-elliptical shape, the opening edge configuring the weld line of each of the joint members.

With the above configuration, the welding length for fixing each of the joint members can be long.

(b) The rear pipe portion is formed in an L-shape and projects rearward, seen from the side of the vehicle.

With the above configuration, the volume surrounded by the ROPS can be largely ensured rearward.

(c) The cross members couple straight portions other than bending portions of the side frame units.

With the above configuration, the cross members can be easily coupled to the side frame units by welding.

(d) The chassis has right and left ROPS supporting frames formed in a substantially W-shape on the right and left sides thereof, and the lower ends of the right and left side frame units are connected to the upper ends of the right and left ROPS supporting frames.

With the above configuration, the attaching operation of the ROPS can be easily performed. In addition, the combination of the side frame units and the supporting frames can improve the appearance from the sides.

DETAILED DESCRIPTION OF THE PREFERRED EMBODIMENTS

Figure 1:
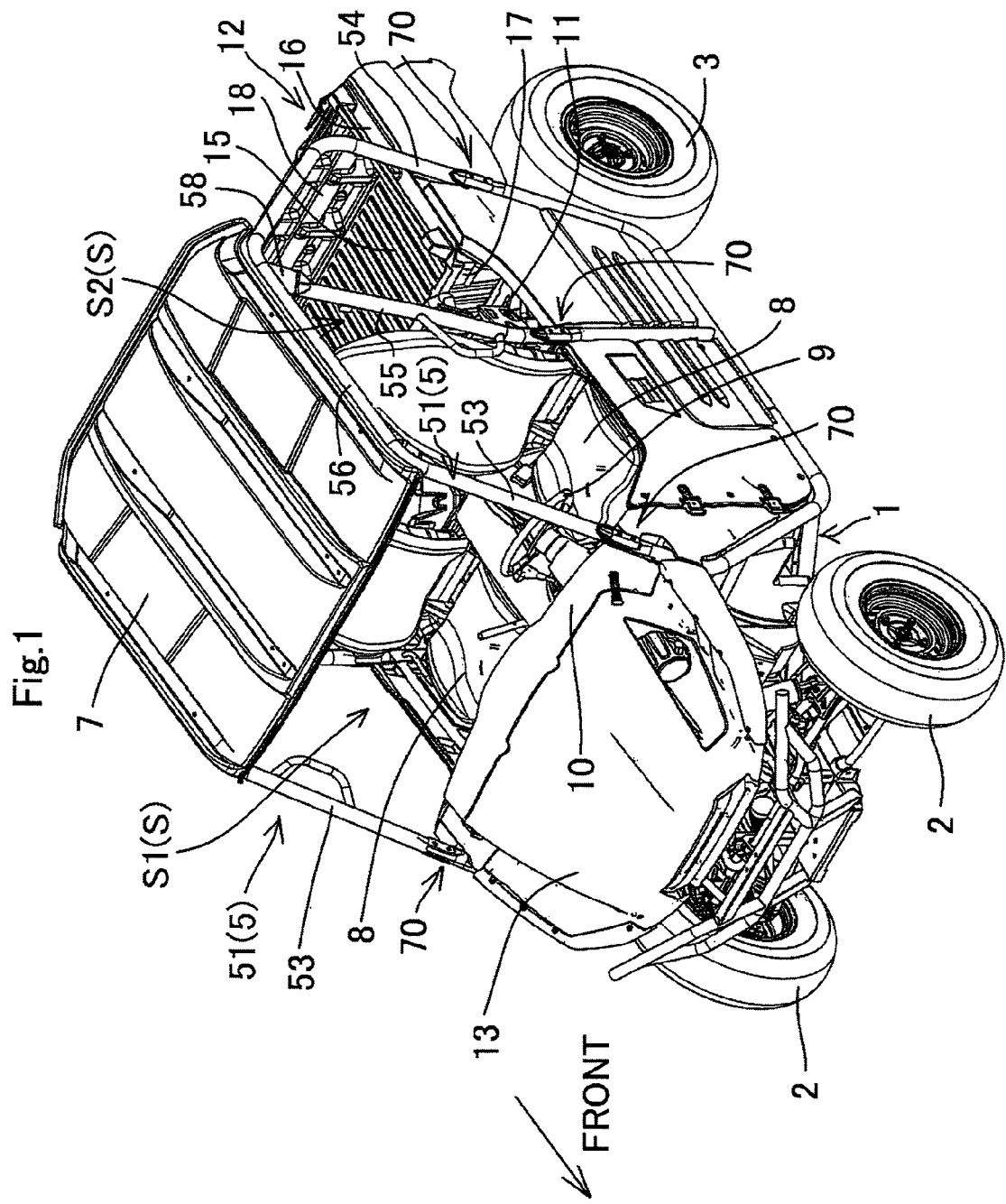
FIG. 1 is a perspective view of a utility vehicle according to the present invention.

An embodiment of the present invention will be described with reference to FIGS. 1 to 8. FIG. 1 is a perspective view of a utility vehicle according to the present invention. A chassis 1 has right and left front wheels 2 at the front thereof, and right and left rear wheels 3 at the rear thereof. A space S over the chassis 1 between the front wheels 2 and the rear wheels 3 is surrounded by a ROPS (rollover protective structure) 5 having a roof 7. The space S has a front riding space (cabin) S1, and a rear storage space S2. In the riding space S1, a front seat row including right and left front seats 8, a steering wheel 9, and a dashboard 10 are arranged. In the storage space S2, right and left storage boxes 11 are arranged. A dumping type cargo bed 12 is provided behind the storage space S2. A hood 13 is provided in front of the riding space S1. The cargo bed 12 has a bottom plate 15, right and left side panels 16, a front panel 17, and a gate type rear panel 18. The rear panel 18 is openable and closable.

Figure 2:
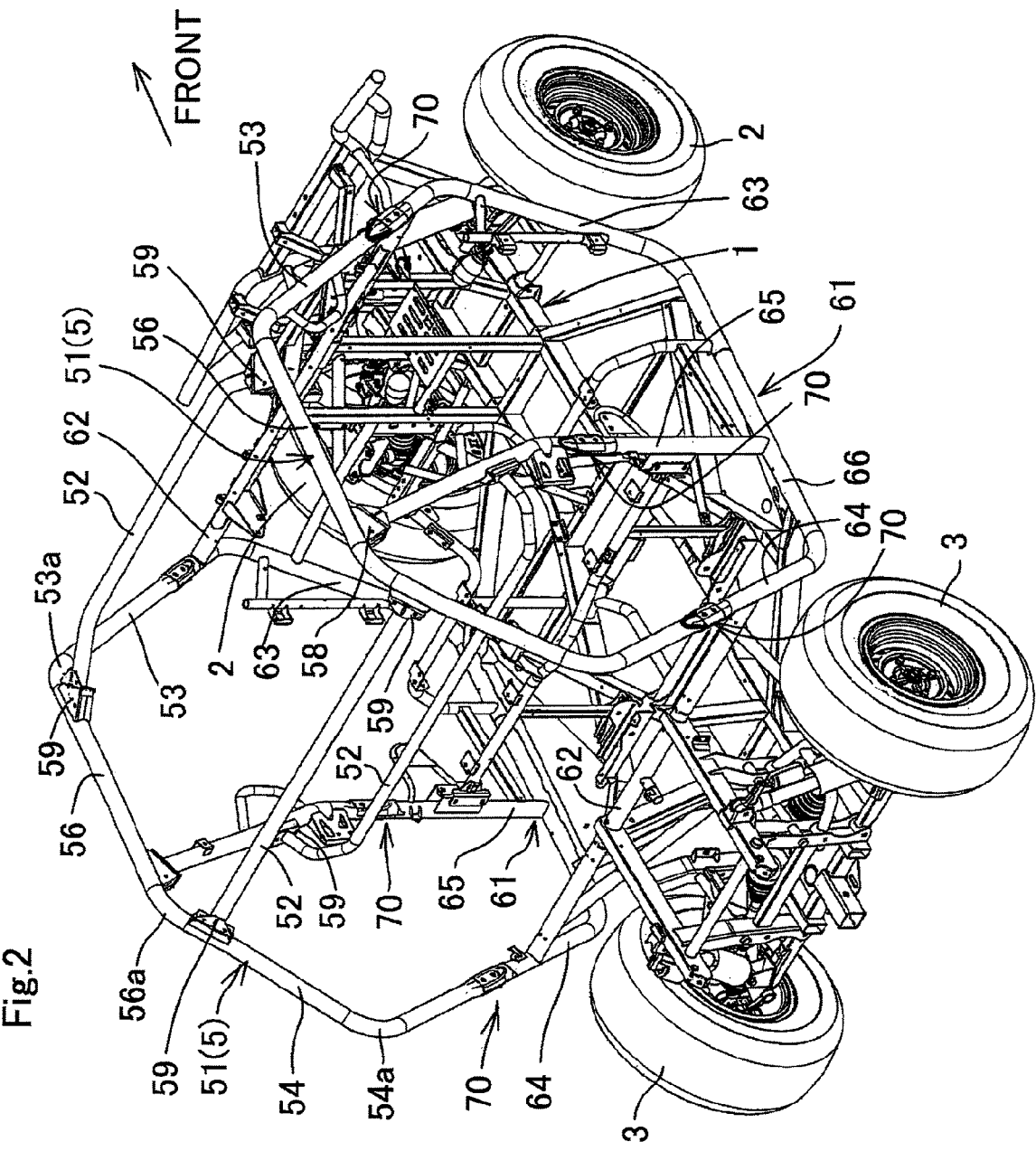
FIG. 2 is a perspective view showing the skeleton configuration of the utility vehicle of FIG. 1.

FIG. 2 is a skeleton diagram of the chassis 1, the ROPS 5, the front wheels 2, and the rear wheels 3 of the utility vehicle. In FIG. 2, the ROPS 5 has right and left metal side frame units 51 in a substantially E-shape, and a plurality of (e.g., three) metal cross members 52 coupling the side frame units 51.

Each of the side frame units 51 has a front pipe portion 53, a rear pipe portion 54, an intermediate pipe portion 55, and an upper pipe portion 56. To attach the side frame units 51 to the chassis 1, right and left metal ROPS supporting frames 61 in a W-shape are fixed to the chassis 1. The ROPS supporting frames 61 are opposite the right and left side frame units 51 from below. Each of the ROPS supporting frames 61 has a front supporting pipe portion 63, a rear supporting pipe portion 64, an intermediate supporting pipe portion 65, and a lower supporting pipe portion 66. In addition, the right and left ROPS supporting frames 61 are coupled by a plurality of cross members 62.

The lower ends of the front pipe portion 53, the rear pipe portion 54, and the intermediate pipe portion 55 of each of the side frame units 51 are coupled to the upper ends of the front supporting pipe portion 63, the rear supporting pipe portion 64, and the intermediate supporting pipe portion 65 of each of the ROPS supporting frames 61, respectively, via joint mechanisms 70.

Of the three cross members 52 of the ROPS 5, one cross member 52 is arranged near the front end of the upper pipe portion 56, another cross member 52 is arranged near the upper end of the rear pipe portion 54, and the other cross member 52 is arranged near the lower end of the intermediate pipe portion 55. All of the cross members 52 are coupled to straight portions other than later-described bending portions 53a, 56a, and 54a via brackets 59 on the side frame units 51.

Figure 3:
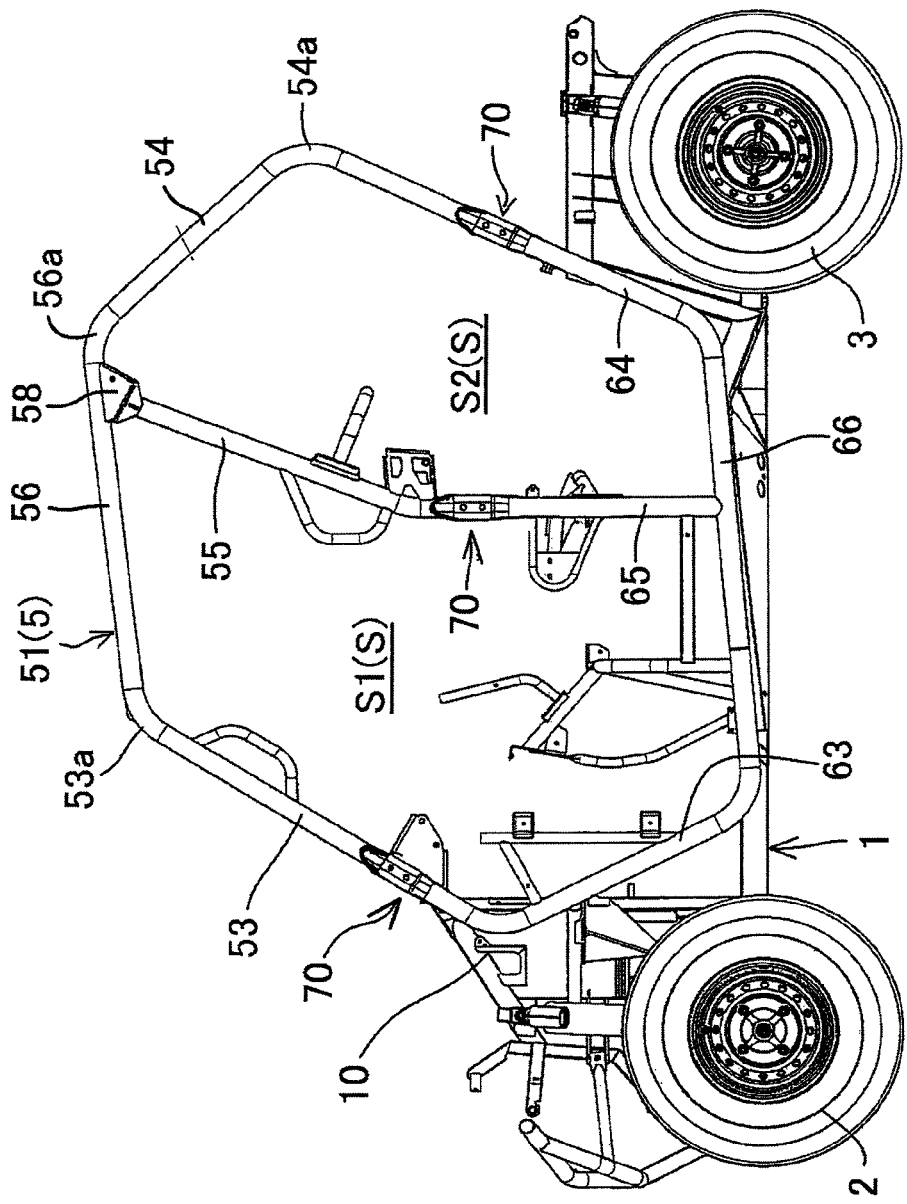
FIG. 3 is a left side view showing the skeleton configuration of the utility vehicle of FIG. 1.

In FIG. 3, the front pipe portion 53 of the ROPS 5 extends rearward and upward from near the dashboard 10. The upper pipe portion 56 of the ROPS 5 extends rearward from the upper end of the front pipe portion 53. The rear pipe portion 54 of the ROPS 5 extends downward from the rear end of the upper pipe portion 56. The intermediate pipe portion 55 extends downward from near the rear end of the upper pipe portion 56. In particular, the rear pipe portion 54 is formed in an L-shape and projects rearward, seen from the side of the vehicle, and has the bending portion 54a in the middle portion in the up-down direction.

In each of the side frame units 51, a section comprising the front pipe portion 53, the upper pipe portion 56, and the rear pipe portion 54 is made by bending one pipe member (i.e., without any pipe joints) to thereby have a one-piece construction, and is entirely formed in a U-shape opened downward. Therefore, the connecting portion of the front pipe portion 53 and the upper pipe portion 56 and the connecting portion of the upper pipe portion 56 and the rear pipe portion 54 are the curved bending portions 53a and 56a, respectively. In addition, the rear pipe portion 54 in an L-shape has the curved bending portion 54a in the middle thereof, as described above. The upper end of the intermediate pipe portion 55 is coupled to a bracket 58 welded to the upper pipe portion 56 with a bolt or a pin.

Figure 4:
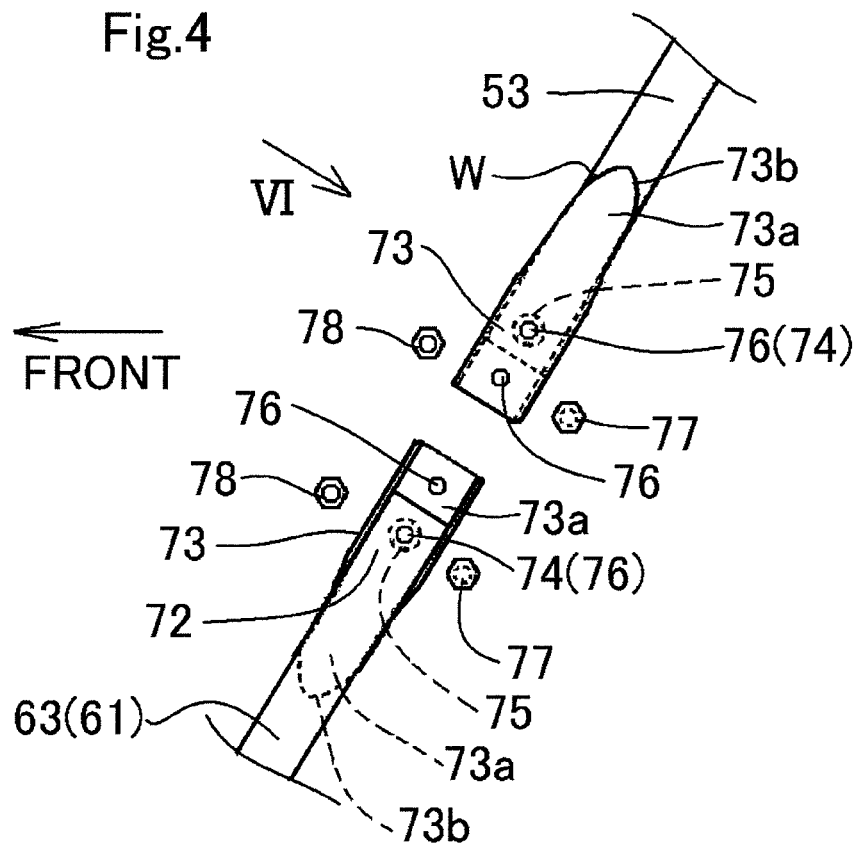
FIG. 4 is an exploded left side view of a joint mechanism of a ROPS of the utility vehicle of FIG. 1.
Figure 5:
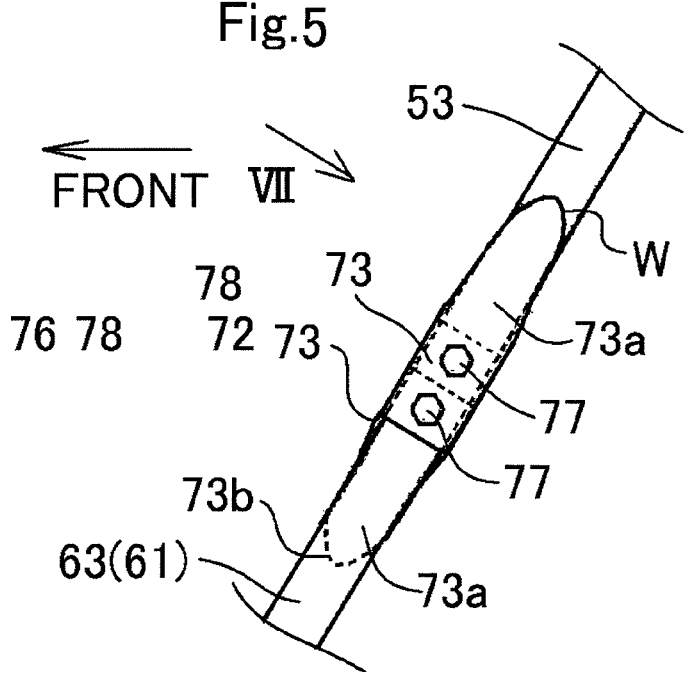
FIG. 5 is a left side view showing the connected state of the joint mechanism of FIG. 4.

The configuration of each of the joint mechanisms 70 coupling the right and left side frame units 51 and the right and left ROPS supporting frames 61 will be described in detail. FIG. 4 is an exploded left side view of the coupling portion of the front pipe portion 53 and the front supporting pipe portion 63, FIG. 5 is a left side view showing the connected state of the coupling portion of FIG. 4, FIG. 6 is a diagram viewed in the direction of arrow VI of FIG. 4, FIG. 7 is a diagram viewed in the direction of arrow VII of FIG. 5, and FIG. 8 is an enlarged sectional view taken along line VIII-VIII of FIG. 6.

Figure 6:
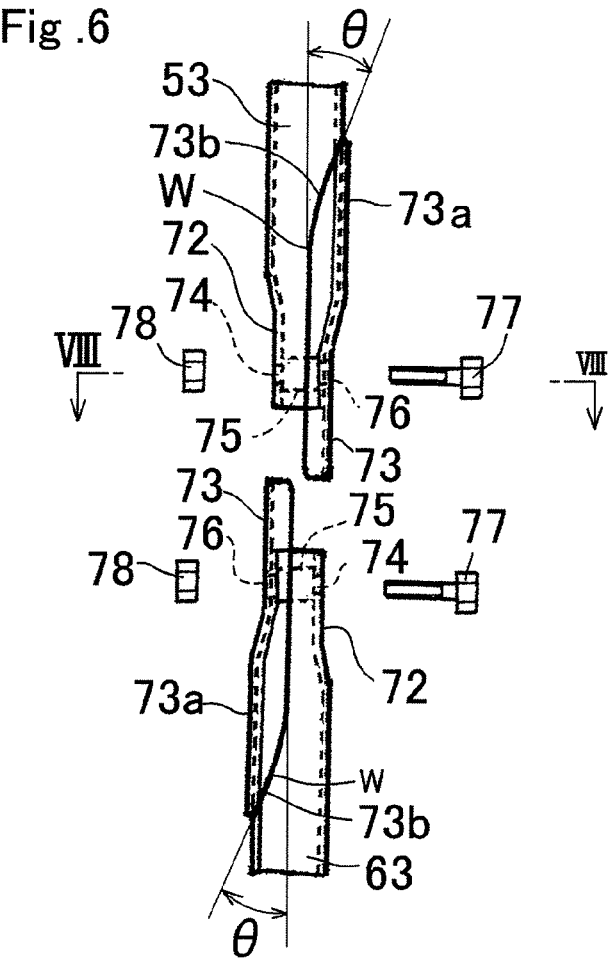
FIG. 6 is a diagram viewed in the direction of arrow VI of FIG. 4.
Figure 7:
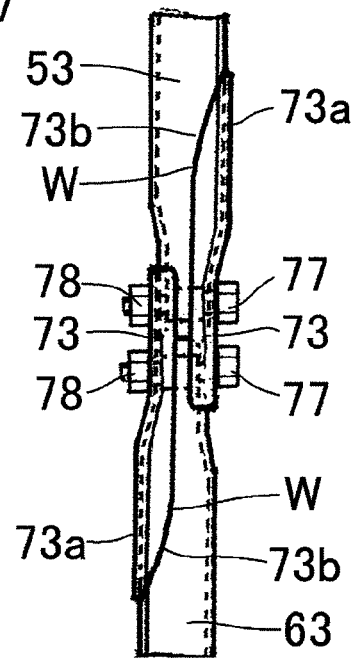
FIG. 7 is a diagram viewed in the direction of arrow VII of FIG. 5.

In FIG. 6, a flat portion 72 of rectangular cross section is provided at the lower end of the front pipe portion 53. The flat portion 72 is press formed in the right-left direction.

Figure 8:
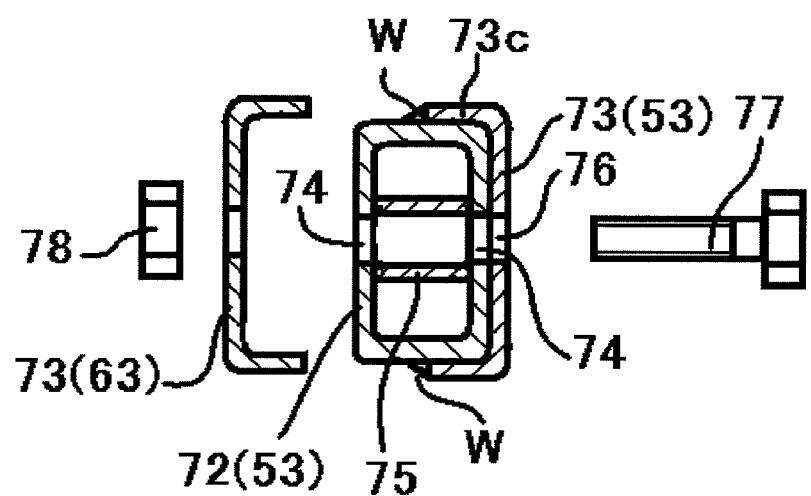
FIG. 8 is an enlarged sectional view taken along line VIII-VIII of FIG. 6.

In FIG. 8, bolt insertion holes 74 extending in the right-left direction are formed in the right and left side walls of the flat portion 72 of the front pipe portion 53. A cylindrical collar 75 is fixed in the position corresponding to the bolt insertion holes 74 between the right and left side walls of the flat portion 72. The collar 75 serves as a spacer.

A metal joint member 73 is fixed to one of the right and left sides of the flat portion 72 by welding W. The joint member 73 has a plane corresponding to the plane of the flat portion 72. The joint member 73 is formed with a bolt insertion hole 76 in the position corresponding to the bolt insertion holes 74. The joint member 73 is also formed at the front and rear ends thereof with bending portions 73c. The bending portions 73c are engaged with the front and rear end faces of the flat portion 72 of the front pipe portion 53. The bending portions 73c perform the positioning in the front-rear direction of the joint member 73 with respect to the flat portion 72.

In FIG. 6, the joint member 73 of the front pipe portion 53 has a lower end projecting downward from the lower end of the front pipe portion 53 by a fixed amount. In addition, the joint member 73 is formed at the upper end thereof with a partially cylindrical extending portion 73a. The extending portion 73a is fitted onto the cylindrical outer peripheral surface of the front pipe portion 53.

The extending portion 73a has an opening edge 73b. The opening edge 73b is cut on a plane inclined at angle θ (e.g., 20° to 45°) to the plane portion of the joint member 73.

As described above, the opening edge 73b of the upper extending portion 73a of the joint member 73 of the front pipe portion 53 is cut at angle θ. Therefore, in FIG. 4, the opening edge 73b is in a semi-elliptical shape, seen from the side.

The joint member 73 has a weld line (W) including the opening edge 73b in a semi-elliptical shape, and the front and rear edges of the plane portion of the joint member 73 from the lower end of the opening edge 73b to the position corresponding to the lower end of the front pipe portion 53. The joint member 73 is line welded throughout the length of the weld line (W). That is, part of the weld line (W) includes the opening edge 73b in a semi-elliptical shape to ensure the long welding length.

In FIG. 4, the configuration of the upper end of the front supporting pipe portion 63 of the ROPS supporting frame 61 is the same as the configuration of the lower end of the front pipe portion 53 except that the configuration of the upper end of the front supporting pipe portion 63 of the ROPS supporting frame 61 is reversed in the right-left direction and the up-down direction, and the same components and portions as those of the lower end of the front pipe portion 53 are indicated by similar reference numerals. That is, the upper end of the front supporting pipe portion 63 is formed with the flat portion 72 of rectangular cross section press formed from the right-left direction, the flat portion 72 having the bolt insertion holes 74 and the collar 75. On the other of the right and left sides of the flat portion 72, the joint member 73 having the plane portion is fixed by welding. The joint member 73 of the front supporting pipe portion 63 has the bolt insertion hole 76. The joint member 63 is formed at the lower end thereof with the partially cylindrical extending portion 73a. The extending portion 73a is fitted onto the cylindrical outer peripheral surface of the front supporting pipe portion 63.

When the lower end of the front pipe portion 53 and the upper end of the front supporting pipe portion 63 are coupled, the projecting portions of the upper and lower joint members 73 are fitted to the lower and upper flat portions 72, an upper bolt 77 is inserted through the upper bolt insertion holes 74 and 76 and the upper collar 75, another lower bolt 77 is inserted through the lower bolt insertion holes 74 and 76 and the lower collar 75, and the bolts 77 are tightened by nuts 78. In this case, each of the collars 75 is arranged in each of the flat portions 72, the collar 75 maintaining the interval between the right and left side walls thereof constant. Therefore, at the time of tightening each of the nuts 78, the right and left side walls of each of the flat portions 72 cannot be deformed. That is, the upper and lower flat portions 72 can be coupled by the joint members 73.

In addition, the bolts 77 are inserted from the sides of the vehicle, so that the insertion and tightening operations of the bolts 77 are easy.

The configuration of the joint mechanism 70 of the rear pipe portion 54 and the rear supporting pipe portion 64 and the configuration of the joint mechanism 70 of the intermediate pipe portion 55 and the intermediate supporting pipe portion 65 in FIG. 3 are the same as the configuration of the joint mechanism 70 of the front pipe portion 53 and the front supporting pipe portion 63.

The above ROPS configuration has the following advantages.

(a) Of the pipe portions configuring each of the side frame units 51, a section comprising the front pipe portion 53, the upper pipe portion 56, and the rear pipe portion 54 is integrally formed in a U-shape by bending one pipe member (i.e., without any joints). Therefore, the number of components for the ROPS can be reduced, and the number of steps of manufacturing the ROPS can be reduced.

(b) The joint members 73 are welded onto the outer peripheral surfaces of the lower ends of the front pipe portion 53, the rear pipe portion 54, and the intermediate pipe portion 55, the joint members 73 coupling each of the side frame units 51 to the chassis 1. The opening edge 73b is formed in a semi-elliptical shape, the opening edge 73b configuring the weld line (W) of each of the joint members 73. Therefore, the welding length can be long.

(c) The rear pipe portion 54 is formed in an L-shape and projects rearward, seen from the side of the vehicle. Therefore, the volume surrounded by the ROPS (space S) can be largely ensured rearward.

(d) The cross members 52 couple straight portions other than the bending portions 53a, 56a, and 54a of the side frame units 51. Therefore, the cross members 52 can be easily coupled to the side frame units 51 by welding.

(e) The right and left ROPS supporting frames 61 in a substantially W-shape are fixed to the chassis 1 so as to be opposite the right and left side frame units 51 of the ROPS 5 from below. The lower ends of the right and left side frame units 51 are coupled to the upper ends of the right and left ROPS supporting frames 61. Therefore, the attaching operation of the ROPS 5 can be easily performed. In addition, the combination of the side frame units 51 and the ROPS supporting frames 61 can improve the appearance from the sides.

Other Embodiments (1) It is a matter of course that the present invention is applicable to a utility vehicle having a bench type front seat in a riding space S1 shown in FIGS. 1 to 3, and is also applicable to a utility vehicle having a plurality of independent type rear seats or a bench type rear seat.

(2) Further, the present invention is applicable to a utility vehicle having a plurality of independent type rear seats or a bench type rear seat which can be retracted so that a cargo bed can be extended forward.

(3) The joint members 73 for connecting the side frame units and the ROPS supporting frames each have the opening edge 73b in an elliptical-shape, but the present invention can have joint members each having an opening edge in a non-elliptical-shape.

(4) The present invention is not limited to the configuration of the embodiment, and includes various modifications contemplated in the scope without departing from the contents described in the claims.

What is claimed is:

1. A utility vehicle comprising:
   a chassis;
   a seat row arranged on the chassis; and
   a rollover protective structure (ROPS) surrounding a riding space including the seat row;
   wherein the ROPS includes a right side frame unit and a left side frame unit, and a plurality of cross members coupling the right side frame unit and the left side frame unit,
   wherein each of the right side frame unit and the left side frame unit includes a front pipe portion extending upward from near a dashboard, an upper pipe portion extending rearward from an upper end of the front pipe portion, a rear pipe portion extending downward from a rear end of the upper pipe portion, and an intermediate pipe portion extending downward from a middle portion in a front-rear direction of the upper pipe portion,
   wherein each of the right side frame unit and the left side frame unit has a section comprising the front pipe portion, the upper pipe portion, and the rear pipe portion integrally formed by bending only one pipe member so as to have a one-piece construction without any joints, and formed to have a U-shape opening downwards.

2. The utility vehicle according to claim 1,
   wherein joint members are welded onto outer peripheral surfaces of lower ends of the front pipe portion and the rear pipe portion of each of the right side frame unit and the left side frame unit, the joint members connecting each of the right side frame unit and the left side frame unit to the chassis; and
   wherein an opening edge is formed in a semi-elliptical shape, the opening edge configured to form a weld line of each of the joint members.

3. The utility vehicle according to claim 1,
   wherein the rear pipe portion has an L-shape and projects rearward, as seen from a side of the vehicle.

4. The utility vehicle according to claim 1,
   wherein the plurality of cross members couple straight portions of each of the right side frame unit and the left side frame unit, and do not couple bent portions of each of the right side frame unit and left side frame unit.

5. The utility vehicle according to claim 1,
   wherein the chassis has a right ROPS supporting frame and a left ROPS supporting frame each formed in a substantially W-shape on the right side and left side thereof, respectively; and
   wherein lower ends of each of the right side frame unit and the left side frame unit are connected to upper ends of the right ROPS supporting frame and the left ROPS supporting frame.

6. The utility vehicle according to claim 1,
   wherein the seat row is one of a plurality of seat rows surrounded by the ROPS.

* * * * *